United States Patent
Tamai

(10) Patent No.: US 6,710,516 B1
(45) Date of Patent: Mar. 23, 2004

(54) VIBRATION WAVE DURING APPARATUS

(75) Inventor: Jun Tamai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 09/589,813

(22) Filed: Jun. 9, 2000

(30) Foreign Application Priority Data

Jun. 15, 1999 (JP) .......................................... 11-168185

(51) Int. Cl.$^7$ ............................................ H01L 41/04
(52) U.S. Cl. ................................................ 310/323.13
(58) Field of Search ...................... 310/323.01, 323.13, 310/323.05, 323.06, 323.09, 328, 323.02; H01L 41/04

(56) References Cited

U.S. PATENT DOCUMENTS

| | | | | |
|---|---|---|---|---|
| 4,645,964 A | * | 2/1987 | Hiramatsu et al. ...... | 310/323.06 |
| 4,678,956 A | * | 7/1987 | Izukawa et al. ........ | 310/323.06 |
| 5,115,161 A | * | 5/1992 | Myohga et al. ......... | 310/323.15 |
| 5,122,700 A | * | 6/1992 | Tamai et al. ........... | 310/323.15 |
| 5,124,611 A | | 6/1992 | Tamai et al. ................. | 310/317 |
| 5,231,325 A | | 7/1993 | Tamai et al. ................. | 310/323 |
| 5,506,462 A | | 4/1996 | Tamai et al. ................. | 310/328 |
| 5,548,175 A | * | 8/1996 | Tamai ..................... | 310/323.12 |
| 5,574,326 A | | 11/1996 | Chiba et al. ................. | 310/323 |
| 5,594,291 A | | 1/1997 | Tamai et al. ................. | 310/323 |
| 5,600,196 A | | 2/1997 | Tamai ........................ | 310/323 |
| 5,684,353 A | | 11/1997 | Fujimoto et al. ............ | 310/323 |
| 5,739,623 A | * | 4/1998 | Kanazawa et al. ..... | 310/323.12 |
| 5,760,529 A | | 6/1998 | Tamai et al. ................. | 310/323 |
| 5,814,919 A | * | 9/1998 | Okumura ............... | 310/323.12 |
| 5,949,178 A | | 9/1999 | Tamai et al. ................. | 310/323 |
| 6,037,702 A | | 3/2000 | Tamai ..................... | 310/323.06 |
| 6,084,335 A | | 7/2000 | Tamai ..................... | 310/316.02 |
| 6,107,724 A | | 8/2000 | Tamai et al. ........... | 310/323.11 |
| 6,107,725 A | | 8/2000 | Tamai ..................... | 310/323.11 |
| 6,140,741 A | * | 10/2000 | Tamai et al. ........... | 310/323.13 |

FOREIGN PATENT DOCUMENTS

| | | |
|---|---|---|
| JP | 5-38170 | 2/1993 |
| JP | 3011981 | 3/1995 |

* cited by examiner

Primary Examiner—Thomas M. Dougherty
Assistant Examiner—Karen Beth Addison
(74) Attorney, Agent, or Firm—Fitzpatrick, Cella, Harper & Scinto

(57) ABSTRACT

A vibration wave driving apparatus includes a vibration member having an electro-mechanical energy conversion element and a vibration member supporting member fixed to an elastic member, each having a through-hole in the axial portion thereof; the apparatus further includes a rotary member in pressure contact with the vibration member and having a through-hole in the axial portion thereof, an output shaft extending through the through-holes of the vibration member and the rotary member, a case supporting the vibration member with the end portion of the vibration member supporting member fixed thereby, and a plurality of bearing for supporting the output shaft provided in the case. The vibration member and the rotary member are packaged, the output shaft is rotated with the rotary member, and the output shaft is supported relative to the through-hole of the vibration member at a position substantially corresponding to a node of a vibration generated in the vibration member within the through-hole of the vibration members.

15 Claims, 4 Drawing Sheets

VIBRATION WAVE DURING APPARATUS

BACKGROUND OF THE INVENTION

1. Field of the Invention

This invention relates to a vibration wave driving apparatus having an output shaft.

2. Related Background Art

Several vibration motors (vibration wave driving apparatuses) having output shafts are known. For example, as shown in FIG. 4 of the accompanying drawings, there is a motor disclosed in Japanese Patent Application Laid-Open No. 5-38170. This motor is such that piezoelectric elements 142 and 144 are disposed between metallic blocks 150 and 152 as hollow cylindrical elastic members and the two metallic blocks 150 and 152 are coupled together into a vibration member 140 by a cylindrical coupling bolt 154 disposed on the inner peripheral side of these metallic blocks 150 and 152. On the other hand, a motor housing (outer case) 170 is such that the cylindrical portion of the central portion of a motor forms a motor supporting portion and a bearing 172 is disposed in the motor supporting portion and supports an output shaft 134, and a ring-shaped flange portion 175 provided on the inner diametral portion of a coupling bolt 154 is fixed to the motor supporting portion and supports the vibration member 140. Also, a rotor portion 130 as a contact member is disposed on one side of the vibration member 140, and this rotor portion 130 is of a construction in which a spring 133 is disposed between a fixed rotor body (disc) 132 and a support plate 136 in the direction of rotation of the output shaft 134, and the rotor body 132 is brought into pressure contact with the end surface of the metallic block 152 by the spring force of a spring 133.

In the above-described example of the prior art, however, only a single bearing is used. Therefore, when a force is applied to the output shaft from a radial side, the output shaft may become inclined with the aforementioned bearing acting as a fulcrum, whereby the rotor portion deviates relative to the vibration member. As a result, a frictional contact state of a rotor contact surface 160, where the rotor body 132 contacts the metallic block 152, becomes non-uniform; this may result in problems such as a reduction in the efficiency of the motor, the occurrence of noise, and wear of the contact surface (a reduction in the life of the motor).

SUMMARY OF THE INVENTION

One aspect of this invention is to provide a vibration type driving apparatus in which a vibration member is supported in a case thereof by a support member, an output shaft is supported by bearings at opposite end portions of the case, where the output shaft is extended through a through-hole in the axial center portions of the vibration member and a rotating member, and the through-hole of the vibration member is used as a sliding bearing for the output shaft. In this manner, the motor may be stably driven even if extraneous forces act on the output shaft from various directions.

DESCRIPTION OF THE PREFERRED EMBODIMENTS

First Embodiment

Figure 1:
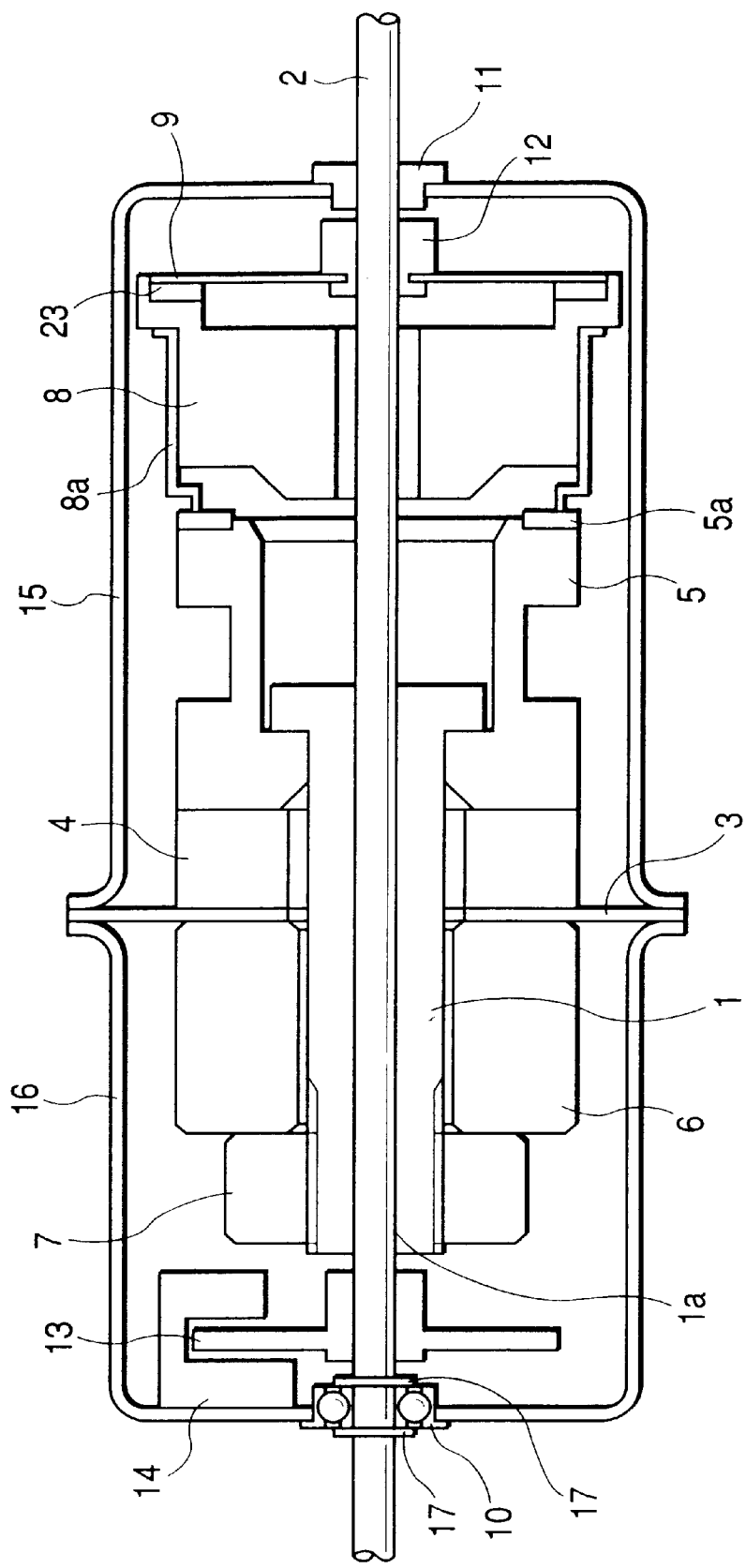
FIG. 1 is a cross-sectional view of a vibration type driving apparatus according to a first embodiment of the present invention.

FIG. 1 shows a first embodiment of the present invention.

In a vibration wave driving apparatus according to this embodiment, a circular ring-shaped piezoelectric element 4 (an electro-mechanical energy conversion element) and a vibration member supporting member 3 formed by a thin plate of a metal or the like are sandwiched between bar-like hollow metallic members 5 and 6 as two elastic members, and these metallic members 5 and 6 are held and fixed by a hollow bolt 1 and a nut 7 made of a metal which are fastening members to thereby constitute a vibration member.

The vibration member in the present embodiment combines two bending vibrations and forms circular or elliptical motion on a driving surface, and the driving principle thereof is described in Japanese Patent Application Laid-Open No. 3-011981, etc. and is already well known and therefore need not be described. The vibration member may be one which combines not only two bending vibrations, but also, for example, a torsional vibration and a longitudinal vibration. There is a hole in the axial center portion of the vibration member, and the vibration wave driving apparatus of the present embodiment need be a vibration wave driving apparatus of a form in which an output shaft 2 extends through this hole.

In the vibration wave driving apparatus of the present embodiment, a rotary member 8 is disposed on one side of the vibration member, and a cylindrical frictional sliding member 8a is fixed to the outer peripheral portion of the rotary member 8; the fore end portion of the frictional sliding member 8a, which is adjacent to this rotary member, is adapted to contact with a frictional sliding member 5a on the vibration member side, which is provided on the outer peripheral end portion of the end surface of the metallic member 5 constituting the vibration member. The rotary member 8 is fitted to the outer diametral portion of a pressing spring 9, which is a belleville spring having its coaxiality and inclination with respect to the output shaft 2 regulated by a caulking member 12, and the sliding member 8a of the rotary member 8 and the frictional sliding member 5a on the vibration member side are adapted to be brought into pressure contact with each other by the spring force of the pressure spring 9.

The vibration member in the present embodiment is constructed with the vibration member supporting member 3 sandwiched and fixed simultaneously with the piezoelectric element 4. The vibration member supporting member 3 is disc-shaped, and the outer peripheral portion thereof is joined to the confronting surfaces of the case portions 15 and 16 of an external case of a two-piece construction. This joint is formed by electric resistance welding, laser welding, adhesion by an adhesive agent or brazing.

The role of the vibration member supporting member 3 is to support the vibration member, but if the vibration member supporting member is too thick and too great in rigidity, a vibration generated by the vibration member will be transmitted to the aforementioned case, and vibration energy of high efficiency will not be generated. Therefore, the vibration member supporting member 3 is provided with suitable flexibility. As a result, a spatial position of the vibration member is not firmly determined relative to the external case 15, 16, and may become inclined or eccentric.

Also as a result, the vibration of the vibration member is not efficiently transmitted to the frictional sliding member 8a of the rotary member 8, and the following problems arise.

1. Creation of motor noise
2. Reduction in motor life due to the localized wear of the frictional sliding member
3. Reduction in motor efficiency In order to prevent these evils, in the present embodiment, the through-hole 1a. of the hollow bolt 1 plays the role of a bearing supporting the output shaft 2.

In the present embodiment, a sintered metallic oil-containing bearing 11 is caulked to one external case portion 15, and on the opposite side, a ball bearing 10 is forced into the other external case 16. The output shaft 2 is supported by those two bearings 10 and 11.

Two snap rings 17 are disposed so as to sandwich the ball bearing 10 therebetween. Therefore, the output shaft 2 has its spatial position determined relative to the aforementioned external case. That is, the position of the output shaft 2 is first determined relative to the external case, and the through-hole la acts as a bearing relative to the output shaft 2 and thus, the position of the vibration member is determined.

On the other hand, the rotary member 8 is fitted to the outer diametral portion of the pressing spring 9 having its coaxiality and inclination with respect to the output shaft 2 regulated by the caulking member 12. Consequently, the rotary member 8 has its spatial position substantially determined relative to the output shaft 2.

Thus, the vibration member and the rotary member 8 have their positions determined with the output shaft 2 as the reference. Therefore, the frictional sliding member 8a on the rotary member side and the frictional sliding member 5a on the vibration member side are capable of stably contacting each other.

In the present embodiment, vibration preventing rubber 23 is interposed between the rotary member 8 and the pressing spring 9, whereby the vibration of the rotary member 8 can be prevented from propagating to the output shaft 2, and the vibration preventing rubber 23 also performs the role of joining the rotary member 8 and the pressing spring 9 together.

Near the ball bearing 10, a rotary plate 13, which is a part of an encoder for detecting the rotated position, is fixed to the output shaft 2. The rotary plate 13 is formed with a number of holes in radial directions, and rotation of the rotary plate is detected by counting incidents of interception and passage of light from a photointerrupter 14 fixed to the inner side of the case 16, to thereby detect the position. If the photointerrupter 14 is one of a fiber type, which can obtain thin rays of light, the resolving power will be improved and the positioning accuracy will also be heightened; therefore, this structure is most desirable. In the present embodiment, a sensor of a light detecting type is used as the photointerrupter, but a potentiometer or the like for detecting the rotated position using variation in an electrical resistance value may be contained in the case.

Second Embodiment

Figure 2:
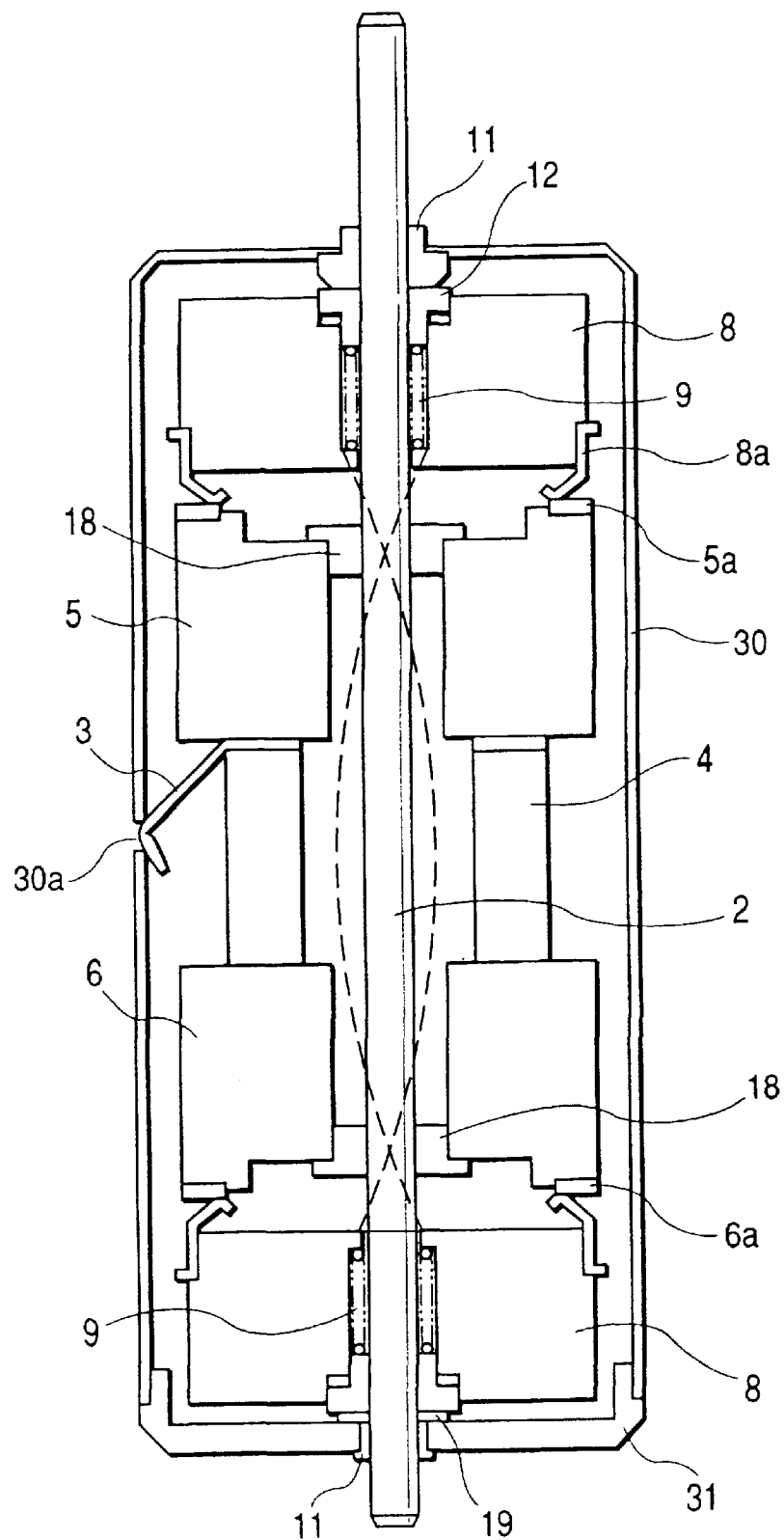
FIG. 2 is a cross-sectional view of a vibration type driving apparatus according to a second embodiment of the present invention.

FIG. 2 shows a second embodiment of the present invention.

A vibration member in this embodiment, unlike that in the first embodiment, does not use a hollow bolt as a fastening member. Metallic members 5 and 6 (two elastic members), a vibration member supporting member 3 and a piezoelectric element 4 are adhesively secured and coupled together by an adhesive agent.

In the present embodiment, frictional sliding portions are provided on opposite ends of the vibration member, and two rotary members 8 are also provided. Thereby, compared with a motor having a single rotary member, the created torque typically becomes double. Also, a large-diametered hole portion is formed in the axis of each rotary member 8 from the outer end side thereof, and the inner end portion side thereof is made small in diameter, and a pressing coil spring 9 is disposed in this large-diametered hole portion so as not to slip off.

Also, a rotation stop 12 is mounted in the aforedescribed large-diametered hole portion on the outer end portion side of each rotary member 8, and a spline is formed in the outer periphery of the rotation stop 12 and is fitted to the rotary member 8. The rotation stop 12 is inserted into the inner spline portion of the rotary member 8 while being forced onto the output shaft 2 and compressing the pressing spring 9. The rotary members 8 are restrained from rotating relative to the rotation stops 12, but can freely slide in the axial direction thereof. Consequently, only the rotational forces of the rotary members 8 can be transmitted to the output shaft 2.

Flanged sliding bearings 18 are provided on the inner diametral end portions of the metallic members 5 and 6 (elastic members). In the present embodiment, the bearing portions of the sliding bearing 18 are made of polyacetal, but depending on the temperature at which the motor is used, a material having good heat resistance such as Nylon, Teflon or PPS is preferable in some cases.

In the present embodiment, the sliding bearings 18 are fixed to the outer sides of the metallic members 5 and 6 (elastic members), and the output shaft 2 is rotated relative to the sliding bearings 18. Alternately, the output shaft 2 and the, sliding bearings 18 may be fixed and the sliding bearings 18 and the metallic members 5 and 6 may be made rotatable relative to each other. In this case, the output shaft 2 may be covered with a heat-contracting tube made of resin or the output shaft 2 may be coated with a resin such as Teflon. Further, if oil is contained in the interior of the resin, the output shaft 2 can be rotated more smoothly, which is desirable.

This oil does not flow out to the outside and, therefore, there is no fear that the oil will contaminate the frictional sliding portion of the vibration member or the rotary member. Also, vibration leakage is preferably little if the sliding bearings 18 are disposed at positions which correspond to nodes of vibration generated in the vibration member. The sliding bearings 18 may be made of an oil-containing sintered metal, but may more desirably be made of resin, because in the case of metal, noise is likely to occur due to the vibration of the vibration member.

The vibration member and the rotary member are assembled together in advance outside the case with the rotation stops 12 forced onto the output shaft 2, and the assembly is inserted into an external case 30 molded by press drawing.

The vibration member supporting member 3 has three radially outwardly extending legs, and as shown in FIG. 2, the tip end portion of each leg is bent and therefore, the insertion of the vibration member supporting member into the external case 30 can be done smoothly. When the rotation stop 12 strikes against a sliding bearing 11 of a sliding bearing type, the vibration member is rotated relative to the external case about the output shaft, and the three legs of the vibration member supporting member 3 are fitted into three holes 30a formed in the external case 30 by the utilization of their elastic forces of restitution.

The number of the legs of the vibration member supporting member is not limited to three, but may be one. The role of the supporting member is to prevent the vibration of the vibration member from being transmitted to the case, and resist a torsional force applied to the vibration member. The displacement of the vibration member near the center thereof is minute and substantially at a right angle with respect to the output shaft and therefore, the supporting member is designed to be soft in this direction and be rigid in the direction of torsion of the vibration member.

A lid member 31 is fitted to the external case 30, and at this time, a spacer 19 made of resin is put onto the output shaft 2. By virtue of this spacer 19, an unreasonable force is not applied to the vibration member supporting member 3, etc., even when an axial force is applied to the output shaft 2.

Lastly, the vibration member supporting member 3 was soldered to the hole 30a of the external case 30, and the external case 30 and the lid member 31 were joined together by an adhesive agent. In these cases, the joint may of course be formed by welding or the like. In the present embodiment, the rotary members 8 are brought into pressure contact with frictional sliding members 5a, 6a on the vibration member side by the pressing springs 9, but the reaction forces thereof are received by the two rotation stops 12 forced onto the output shaft 2 and therefore, there is not any friction loss by forces axially created in the bearings 11.

While in the above-described first embodiment, the reaction force created by the pressing spring 9 being pressed is received by the ball bearing 10 of the ball bearing type through the snap ring 17 lying outside the external case, the ball bearing need not be used in the present second embodiment.

Also, frictional sliding members 8a on the rotary member side have their portions corresponding to sliding portions bent. This is means for widening the frictionally sliding area, reducing the surface pressure of a frictionally sliding surface, decreasing the wear of a frictional material, and lengthening the life of the motor.

Third Embodiment

Figure 3:
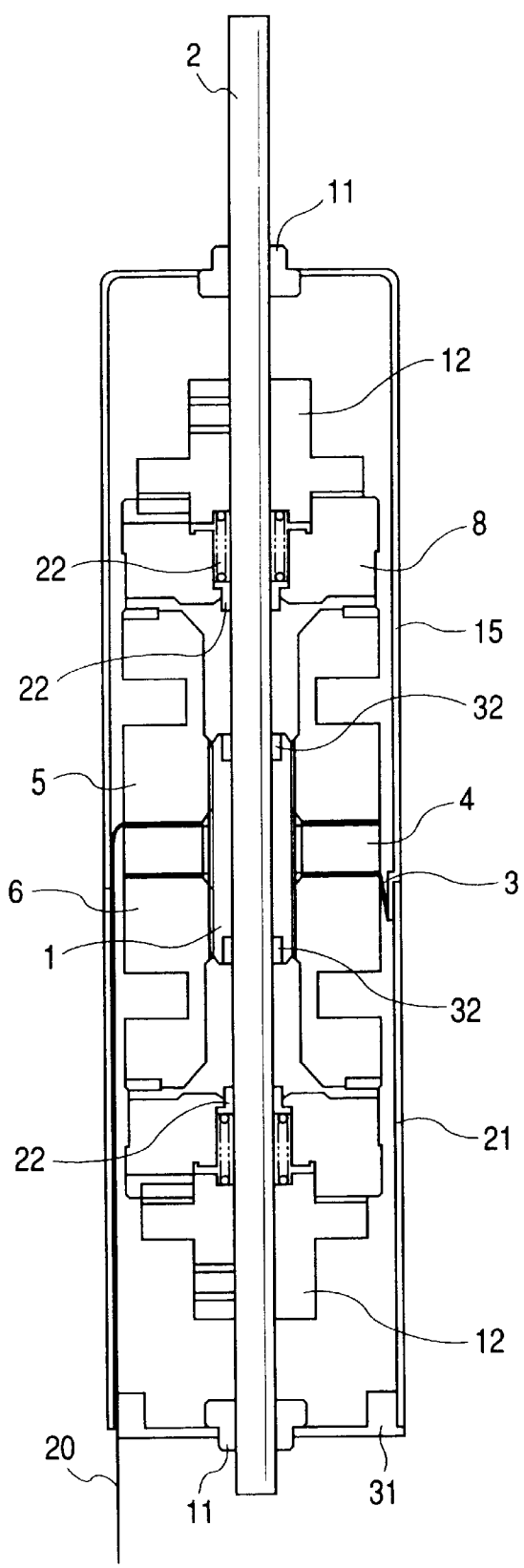
FIG. 3 is a cross-sectional view of a vibration type driving apparatus according to a third embodiment of the present invention.
Figure 4:
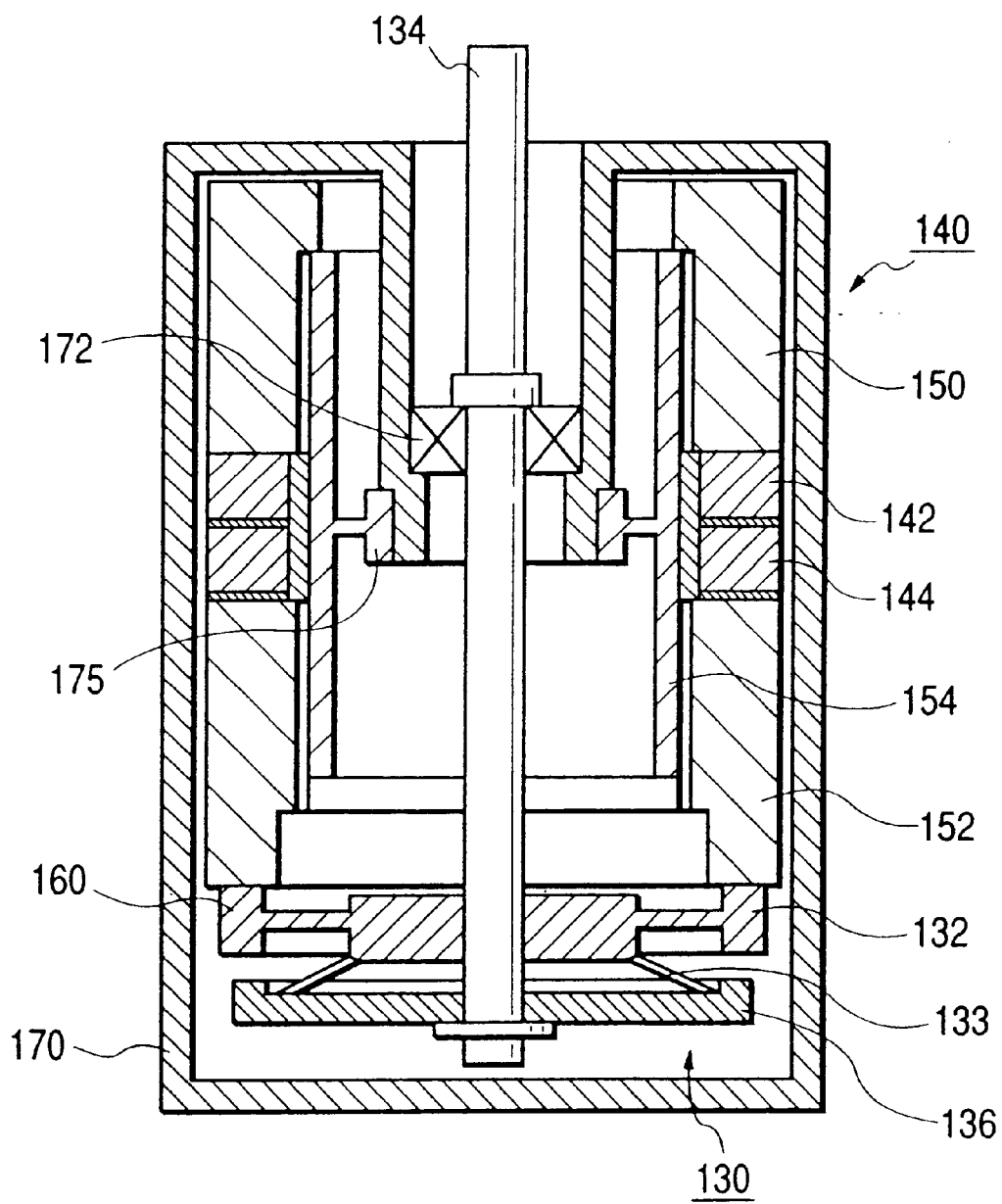
FIG. 4 is a cross-sectional view of a vibration type driving apparatus according to the prior art.

FIG. 3 shows a third embodiment of the present invention.

This third embodiment, like the second embodiment, is of a type in which rotary members 8 are provided on opposite end portions of a vibration member, and a sliding bearing 22 comprised of a sliding bearing similar to the sliding bearing 18 in the second embodiment is provided in the hole portion of the small-diametered portion side on the inner end side of each rotary member 8. This sliding bearing 22 is made of resin and is forced into the aforedescribed bore of each rotary member 8. By virtue of this sliding bearing 22, each rotary member 8 is rotatable without being eccentric relative to tie output shaft 2. Therefore, irregularity of the rotation of the motor is reduced.

Also, in the present embodiment, sliding bearings 32 of a sliding bearing type are forced into opposite ends of the bore portion of a hollow bolt 1.

A vibration member supporting member 3 is interposed and fixed between external case portions 15 and 21.

Besides a piezoelectric element 4 and the vibration member supporting member 3, a flexible printed substrate 20 is held and fixed between two elastic members 5 and 6, and extends outwardly along the inner surfaces of the external case portions 15 and 21. This flexible printed substrate 20 is used as wiring for the supply of an electric current to the piezoelectric element 4, the supply of an electric current produced by a voltage produced in the piezoelectric element, and further an electric current to a rotated position detecting element like a potentiometer.

As described above, according to the present invention, the positional relation of the output shaft is determined relative to the through-hole of the vibration member. Therefore, the vibration member is not inclined with respect to the output shaft, and even if a sideways force is applied to the output shaft, the contact state of the frictionally sliding surface is stabilized. Therefore, the vibration wave driving apparatus of the present invention has high efficiency and long life.

The bearing is also provided in the through-hole of the rotary member, whereby when the rotary member is rotated, the eccentricity relative to the axis of the vibration member is also decreased. Therefore, the motor of the present invention is a more excellent motor. Further, the bearing surface of the sliding bearing or the surface of the output shaft supported by the bearing surface is made of resin, whereby the occurrence of noise is suppressed.

What is claimed is:

1. A vibration wave driving apparatus comprising:
   a vibration member formed by an elastic member having an electro-mechanical energy conversion element fixed thereto, and having a through-hole extending through a central portion thereof;
   a support member fixed to said vibration member;
   a rotary member in press contact with said vibration member, and having a through-hole extending through a central portion thereof;
   an output shaft extending through the through-hole of said vibration member and the through-hole of said rotary member, and rotatable with said rotary member,
   a case packaging said vibration member and said rotary member therein, and fixing one end portion of said support member, thereby supporting said vibration member; and
   a plurality of bearings provided in said case, said plurality of bearings rotatably supporting said output shaft,
   wherein said output shaft provides a bearing surface that locates a radial position of said vibration member at an axial position within the through-hole of said vibration member corresponding to a node of a vibration generated in said vibration member.

2. A vibration wave driving apparatus according to claim 1, wherein at least a portion of the through-hole of said vibration member provides a bearing surface at the axial position corresponding to a node of the vibration generated in said vibration member.

3. A vibration wave driving apparatus according to claim 1, further comprising at least one bearing disposed in the through-hole of said vibration member, between said vibration member and said output shaft, each said at least one bearing being provided at a respective node of a vibration generated in said vibration member.

4. A vibration wave driving apparatus according to claim 3, wherein said at least one bearing is a sliding bearing.

5. A vibration wave driving apparatus according to claim 4, wherein at least one of the bearing surface of said output shaft and a bearing surface of said sliding bearing is formed of resin.

6. A vibration wave driving apparatus according to claim 1, wherein at least one of the plurality of bearings provided in said case is a sliding bearing.

7. A vibration wave driving apparatus according to claim 6, wherein at least one of the bearing surface of said output shaft and a bearing surface of said sliding bearing is formed of resin.

8. A vibration wave driving apparatus according to claim 1, further comprising at least one bearing disposed in the through-hole of said rotary member, between said rotary member and said output shaft.

9. A vibration wave driving apparatus comprising:
   a vibration member formed by a plurality of elastic members each of which has a through-hole at a center portion thereof and an electro-mechanical energy conversion element having a through-hole at a center portion thereof and fixed between said plurality of elastic members;
   a supporting member fixed to said vibration member;
   a plurality of rotary members in press contact with said elastic member, each of said plurality of rotary members having a through-hole at a center portion thereof;
   an output shaft extending through the through-hole of said vibration member and the through-hole of each of said plurality of rotary members, and rotatable with said plurality of rotary members;
   a case packaging said vibration member and said plurality of rotary members, and fixing one end portion of said supporting member; and
   a plurality of bearings provided in said case, and through which said output shaft is inserted,
   wherein said output shaft provides a bearing surface that locates a radial position of said vibration member at an axial position within the through-hole of said vibration member corresponding to a node of a vibration generated in said vibration member.

10. A vibration wave driving apparatus according to claim 9, further comprising at least one bearing disposed in the through-hole of said vibration member, between said vibration member and said output shaft, each said at least one bearing being provided at a respective node of a vibration generated in said vibration member.

11. A vibration wave driving apparatus according to claim 10, wherein said at least one bearing is a sliding bearing.

12. A vibration wave driving apparatus according to claim 11, wherein at least one of the bearing surface of said output shaft and a bearing surface of said sliding bearing is formed of resin.

13. A vibration wave driving apparatus according to claim 9, wherein at least one of the plurality of bearings provided in said case is a sliding bearing.

14. A vibration wave driving apparatus according to claim 13, wherein at least one of the bearing surface of said output shaft and a bearing surface of said sliding bearing is formed of resin.

15. A vibration wave driving apparatus according to claim 9, further comprising at least one bearing disposed in the through-hole of at least one rotary member of said plurality of rotary member, between said at least one rotary member and said output shaft.

* * * * *

UNITED STATES PATENT AND TRADEMARK OFFICE
CERTIFICATE OF CORRECTION

PATENT NO.        : 6,710,516 B1                                    Page 1 of 1
APPLICATION NO.  : 09/589813
DATED             : March 23, 2004
INVENTOR(S)       : Jun Tamai It is certified that error appears in the above-identified patent and that said Letters Patent is hereby corrected as shown below:

COVER PAGE AT ITEM [54] TITLE:
"DURING" should read --DRIVING--.

COVER PAGE AT ITEM [57] ABSTRACT:
Line 12, "bearing" should read --bearings--.

COLUMN 1:
Line 1, "DURING" should read --DRIVING--.

COLUMN 3:
Line 25, "through-hole 1a" should read --through-hole 1a--.

COLUMN 6:
Line 38, "member," should read --member;--.

COLUMN 8:
Line 29, "member," should read --members,--.

Signed and Sealed this

Twenty-second Day of January, 2008

JON W. DUDAS
*Director of the United States Patent and Trademark Office*